United States Patent [19]
Yoshimura et al.

[11] Patent Number: 5,976,440
[45] Date of Patent: Nov. 2, 1999

[54] CELLULOSE DIACETATE SPINNING DOPE AND A PROCESS FOR PRODUCING A CELLULOSE DIACETATE FIBER

[75] Inventors: Mie Yoshimura; Toshimasa Kuroda, both of Ibaraki, Japan

[73] Assignee: Teijin Limited, Osaka, Japan

[21] Appl. No.: 09/082,007

[22] Filed: May 20, 1998

[30] Foreign Application Priority Data

May 20, 1997  [JP]  Japan .................................. 9-129502

[51] Int. Cl.$^6$ ............................... D01D 5/04; D01D 1/10; D01D 2/30
[52] U.S. Cl. ............................. 264/207; 264/211
[58] Field of Search ...................... 264/207, 211

[56] References Cited

U.S. PATENT DOCUMENTS 4,888,147  12/1989  Mochida et al. ......................... 264/207

FOREIGN PATENT DOCUMENTS

WO9529209  11/1995  WIPO .

OTHER PUBLICATIONS

WPI Abstract Accession No. 95–032975 [05] & JP 060316810 A (Mitsubishi Rayon) Nov. 15, 1994.

*Primary Examiner*—Leo B. Tentoni
*Attorney, Agent, or Firm*—Sughrue, Mion, Zinn, Macpeak & Seas, PLLC

[57] ABSTRACT

A spinning dope for the stable production of a cellulose diacetate fiber at a high productivity rate, such fiber being almost free from the occurrence of fluffs and excellent in strength and elongation properties. The spinning dope is a composition formed of (1) acetone or a solvent containing acetone and 0 to 5% by weight, based on the acetone, of water or methanol, (2) 24 to 33% by weight, based on the total weight of the composition, of cellulose diacetate, and (3) at least a phthalate ester, an aliphatic dibasic acid ester, a fatty acid ester, a phosphate ester, an epoxy plasticizer or a glycol-ester-containing plasticizer; and the composition has a thixotropy index (I), represented by the following equation, of at least 1.3, $$I = \eta_6/\eta_{60}$$

wherein $\eta_6$ and $\eta_{60}$ are viscosity measured with a Brookfield viscometer at a rotor rotation of 6 rpm and 60 rpm, respectively, and 35° C.

5 Claims, No Drawings

CELLULOSE DIACETATE SPINNING DOPE AND A PROCESS FOR PRODUCING A CELLULOSE DIACETATE FIBER

FIELD OF THE INVENTION

The present invention relates to a cellulose diacetate spinning dope which contains a specific plasticizer and can be stably dry-spun at a high rate, and a process for producing a cellulose diacetate fiber from the spinning dope.

PRIOR ART

A cellulose diacetate fiber has characteristics such as dry texture and excellent color formability and is used for bedclothes, a lining of clothes and the like, taking advantage of these characteristics. In addition, consumers' needs for higher-quality textiles in the field of clothes have been intensified and diversified in recent years, and further improvements in texture and color formability are desired. The use of a cellulose diacetate fiber is expanding to the field of women's outer clothes.

In the method of dry-spinning a cellulose diacetate fiber, the spinning rate is generally 300 to 800 m/minute, while spinning at a higher rate is industrially advantageous. As the spinning rate is increased, the fiber strength increases to some extent, that is, by 0.1 to 0.2 g/de. However, since the strength that can be originally attained at a low spinning rate is only 1.0 to 1.3 g/de, it is required to prepare a cellulose diacetate fiber having an elongation percentage of 25% or more, preferably 30% or more for preventing fluffing in post-processing such as weaving or knitting operation. As the spinning rate is increased, a spinning tension increases, thereby increasing the molecular orientation of cellulose diacetate. As a result, the elongation percentage decreases. The problem to be solved for improving productivity is how the elongation percentage can be prevented from decreasing and equalized with that of a fiber spun at a low spinning rate.

For overcoming the above problem, there have been proposed various spinning conditions for preventing an increase in elongation stress. For example, there is a method in which a sharp increase in elongation stress is prevented by decreasing a spinning draft or moderating the rate at which a solvent is dried after a fiber is spun from a spinneret. The effect of the above method, however, is not sufficient for increasing the spinning rate to 900 to 1000 m/class.

On the other hand, as the cellulose diacetate concentration in a spinning solution (dope) is decreased, a dope viscosity decreases. Although a method in which a spinning is carried out under this condition may be considered to be used, the surface of a fiber obtained from the above low-concentration dope has many sinuous recessed and projecting parts. This indicates that a skin layer is formed by drying a solvent on an outermost layer of the fiber, a solvent then evaporates from the inside of the fiber to decrease an internal pressure, and this allows a volume contraction to continue until a final cross-sectional area is attained with the length of a circumference formed by the skin layer maintained. It is assumed that this is because the skin layer is not easily destroyed due to a low spinning stress. The above phenomenon is prominent especially when a low-concentration dope is used. A large number of the concaves and convexes on a fiber surface are liable to cause fluffs during the post-processing and a large amount of a solvent is required, which is never desirable in view of a cost for recovery and global environments.

PROBLEMS TO BE SOLVED BY THE INVENTION

The present inventors have made diligent studies for overcoming the above conventional problems and have found the following. When a specific plasticizer is used, a viscosity is further decreased under the load of an elongation stress, the spinning rate can be increased even under a low spinning tension, and a cellulose diacetate fiber, almost free from the occurrence of fluffs in the post-processing and in wears and excellent in strength and elongation properties, can be produced at a high productivity rate.

MEANS FOR SOLVING THE PROBLEMS

According to the present invention, there is provided a cellulose diacetate spinning dope formed of a composition consisting essentially of (1) acetone or a solvent containing acetone and 0 to 5% by weight, based on the acetone, of water or methanol, (2) 24 to 33% by weight, based on the total weight of the composition, of cellulose diacetate, and (3) 1 to 3% by weight, based on the cellulose diacetate, of at least one plasticizer selected from the group consisting of phthalate ester, aliphatic dibasic acid ester, a fatty acid ester, phosphate ester, an epoxy plasticizer and a glycol-ester-containing plasticizer, the composition having a thixotropy index (I), represented by the following equation, of at least 1.3, $$I = \eta_6 / \eta_{60} \qquad (1)$$

wherein $\eta_6$ is a viscosity (poise) measured with a Brookfield viscometer at a rotor rotation speed of 6 rpm at 35° C., and $\eta_{60}$ is a viscosity (poise) measured with a Brookfield viscometer at a rotor rotation of 60 rpm at 35° C.

According to the present invention, there is further provided a process for producing a cellulose diacetate fiber, which comprises dry-spinning the above cellulose diacetate spinning dope.

The present invention will be explained further in detail hereinafter.

In the present invention, the cellulose diacetate is selected from those having an average acetylation degree of 53% to 59%. The concentration of the cellulose diacetate in a dope must be in the range of from 24 to 33% by weight. When the above concentration is lower than 24% by weight, the dope has a viscosity lower than necessary, and a higher concentration is desirable in view of the recovery of a solvent. On the other hand, when the above concentration exceeds 33% by weight, a transportation pressure on the spinning line becomes high and it is difficult to stabilize the flowability at the inside of a pipe and a spinneret. This is undesirable in view of stabilization of spinning operation.

The solvent to be used in the present invention is acetone or acetone containing 0 to 5% by weight of water or methanol. The thixotropic characteristic in the present invention is very small. When the amount of water or methanol which acts to decrease the viscosity of the dope exceeds 5.0% by weight, the water or methanol is liable to undergo phase separation with acetone (having a boiling point 56.6° C.) at the time of drying a spun fiber, and spots are liable to be formed in a fiber structure undesirably. The content of water or methanol in acetone is preferably 1 to 4% by weight.

The plasticizer to be used in the present invention is selected from phthalate ester, aliphatic dibasic acid ester, fatty ester, phosphate ester, an epoxy plasticizer or an ester-based plasticizer. The content of the plasticizer based on the diacetate must be 0.1 to 3.0% by weight. Specifically, for example, (i) the phthalate ester includes dimethyl phthalate, diethyl phthalate, dibutyl phthalate, di-2- ethylhexyl phthalate, diisodecyl phthalate and butylbenzyl phthalate; (ii) the aliphatic dibasic acid ester includes dioctyl adipate, isodecyl adipate, dioctyl azerate and dioctyl sebacate; (iii) the fatty ester includes tributyl acetylcitrate; (iv) the phosphate ester includes trimethylphosphoric acid, triphenylphosphoric acid, trioctylphosphoric acid and dioctylmonophenylphosphoric acid; (v) the epoxy plasticizer includes butyl epoxystearate and dioctyl epoxyhexahydroxyphthalate; and (vi) the glycol-ester-based plasticizer includes diethylene glycol dibenzoate. Of these, preferred are plasticizers which hardly bleed out, i.e., which are in the form of a solid at room temperature. Phosphate ester and a glycol-ester-based plasticizer are preferred. The amount of the plasticizer based on the diacetate must be 0.1 to 3.0% by weight. When the above amount is less than 0.1% by weight, spinning cannot be carried out under the condition of a low spinning stress, due to insufficient thixotropic characteristic, and the resulting spun fiber has a low elongation percentage. On the other hand, when the above amount exceeds 3.0% by weight, the resulting spun fiber shows a remarkable decrease in strength. Therefore, the amount of the plasticizer based on the diacetate is in the range of from 0.1 to 3.0% by weight, preferably 0.3 to 1.5% by weight.

The spinning dope of the present invention is characterized in that it has a thixotropy index (I), represented by the following equation, of at least 1.3, $$I = \eta_6/\eta_{60} \quad (1)$$

wherein $\eta_6$ is a viscosity (poise) measured with a Brookfield viscometer at a rotor rotation of 6 rpm at 35° C., and $\eta_{60}$ is a viscosity (poise) measured with a Brookfield viscometer at a rotor rotation of 60 rpm at 35° C.

When the spinning dope has a thixotropy index (I) of at least 1.3, a cellulose diacetate fiber can be obtained at a high productivity rate by a dry spinning. When the above thixotropy index (I) is less than 1.3, a yarn obtained by dry-spinning the above dope has a low elongation percentage, and the resistance to fluffing in a post processing and in use is not sufficient.

On the other hand, when the thixotropy index (I) is 1.3 or more, even a yarn obtained by a high-speed spinning has a high elongation percentage, and the dope can have a high acetate concentration. As a result, the occurrence of concaves and convexes on a fiber surface decreases, and the productivity can be improved without increasing a cost required for recovering a solvent. The thixotropy index (I) is preferably in the range of from 1.3 to 5.

When the thixotropy index (I) exceeds 5, an elongation viscosity hardly increases, the orientation crystallization of diacetate is inhibited, and the spinability is liable to be poor. A various stabilizer or colorant can be added to the dope of the present invention.

The spinning conditions and means using the spinning dope are basically the same as those conditions and means which are generally employed for dry-spinning a cellulose diacetate.

EXAMPLES

The present invention will be explained in detail with reference to Examples hereinafter.

Example 1

A cellulose diacetate having an average acetylation degree of 55.3% was dissolved in a solvent system containing a mixed solvent (acetone and water) and a plasticizer shown in Table 1, to prepare a dope having an acetate concentration of 28.8% by weight. The dope was measured for a viscosity at a dope temperature of 35° C. with a Brookfield viscometer at a rotation of 6 rpm and 60 rpm. Further, with the dope temperature kept at 65° C., the dope was transported and spun into a spinning cylinder having an ambient temperature of 75° C. through a spinneret having 20 orifices, each of which has a diameter(D) of 0.035φ and an L(Land length)/D=2, and a spun fiber was rolled up at a rate of 950 m/minute. Table 1 shows the denier, strength and elongation percentage of the above yarn. Further, for evaluating the yarn for resistance to fluffing, the above yarn was woven to form a cylindrical fabric with a 28 G circular weaving machine, the fabric was dyed at 70° C. for 40 minutes, the dyed fabric was subjected to Martindale abrasion test using Martindate wear and abration tester produced by James H. Heal & Co. Ltd, Halifax, England. (according to JIS L1096 E), and the number of the abrading operation was increased to 1,000 to 3,000 times by 500 times each to count a maximum abrasion number at which the fabric was not yet broken. Table 1 shows the maximum abrasion number and a condition during the spinning process.

TABLE 1

| Run No. | Acetate concentration wt % | Water wt % | Plasticizer | Amount: wt %/acetate | $\eta_6$ Poise | $\eta_{60}$ Poise | I |
|---|---|---|---|---|---|---|---|
| 1 | 28.8 | 3.0 | — | | 500 | 492 | 1.02 |
| 2 | 28.8 | 3.0 | Triphenyl phosphate | 0.05 | 492 | 468 | 1.05 |
| 3 | 28.8 | 3.0 | Triphenyl phosphate | 0.1 | 480 | 355 | 1.35 |
| 4 | 28.8 | 3.0 | Triphenyl phosphate | 0.5 | 431 | 304 | 1.42 |
| 5 | 28.8 | 3.0 | Triphenyl phosphate | 2.0 | 385 | 226 | 1.70 |
| 6 | 28.8 | 6.0 | Triphenyl phosphate | 2.0 | 332 | 154 | 2.15 |
| 7 | 28.8 | 3.0 | Triphenyl phosphate | 4.0 | 289 | 119 | 2.43 |
| 8 | 28.8 | 2.0 | Diethylene glycol dibenzoate | 0.3 | 310 | 103 | 2.99 |
| 9 | 35.5 | 5.0 | Diethylene glycol dibenzoate | 3.5 | 1,080 | 404 | 2.67 |
| 10 | 22.8 | 2.0 | — | | 125 | 98 | 1.26 |

| Run No. | de | Strength g/de | Elongation percentage % | Cross-sectional form | Maximum abrasion number | Spinning condition |
|---|---|---|---|---|---|---|
| 1 | 75 | 1.2 | 13 | Roundish | 1,000 | Δ |
| 2 | 75 | 1.1 | 18 | Roundish | 1,000 | Δ |
| 3 | 75 | 1.2 | 24 | Roundish | 1,500 | ○ |

TABLE 1-continued

| 4  | 75 | 1.3 | 26 | Roundish     | 2,000 | O |
|----|----|-----|----|--------------|-------|---|
| 5  | 75 | 1.2 | 30 | Roundish     | 2,500 | O |
| 6  | 75 | 1.0 | 19 | Opaque spots | 1,500 | X |
| 7  | 75 | 1.0 | 17 | Opaque spots | 1,000 | X |
| 8  | 75 | 1.2 | 37 | Roundish     | 3,000 | O |
| 9  | 75 | 1.1 | 20 | Roundish     | 1,000 | X |
| 10 | 75 | 1.3 | 27 | Uneven       | 1,000 | O |

In Run No. 1, no plasticizer was added, and in Run No. 2, the plasticizer was deficient in amount. As a result, the thixotropy index (I) defined in the present invention was small in these Runs, filament breakage occurred, and obtained yarns had a low elongation percentage. Further, their resistance to fluffing was also insufficient. In Run Nos. 3, 4, 5 and 8, the thixotropy index (I) each was 1.3 or more, and the spinning condition was stabilized as the spinning tension was decreased. The strength and elongation percentages of the obtained yarns are both high, and therefore, the yarns had excellent resistance to fluffing. In Run No. 6, the amount of water added was large, and in a drying step on a spinning line, the phase separation between water and acetone was accelerated, and water was liable to remain within a fiber cross section. As a result, an opacity which was assumed to have been caused by an unhomogeneously dissolved state was found in a fiber cross section. Therefore, the fiber in Run No. 6 had low strength and a small elongation percentage and had low strength against abrasion. In Run No. 7, further, a defect caused by the excessive addition of the plasticizer was exhibited, a non-uniform phase separation took place in the drying step, i.e., the step where a fiber structure was developed, and the fiber had low strength and a small elongation percentage. Further, in Run No. 9 in which the acetate concentration was too high, a spinning elongation stress tended to decrease by adding excess plasticizer and water. However, it was still insufficient, and the strength and the elongation percentage inevitably decreased. Further, the spinning condition was poor, a high pressure was exerted on tubing and filter systems, and it was suggested that an undissolved component remained. The excessively high acetate concentration is undesirable in view of the frequency of filter replacement. In Run No. 10, no plasticizer was added and the acetate concentration was decreased in order to improve spinnability at a high rate, strength and elongation percentage. However, an obtained fiber had low strength against abrasion, which was caused by extreme concaves and convexes, i.e., a skin/core structure. Further, it was necessary to use and recover a large amount of solvent, and undesirably, an additional cost is required in view of energy.

The present invention can provide a spinning dope for producing a cellulose diacetate fiber by a dry spinning, which enables stable spinning at a high productivity rate and can give a fiber that is almost free from the occurrence of fluffs in processing and in use and is excellent in strength and elongation properties.

What is claimed is:

1. A process for producing a cellulose diacetate fiber having an elongation of 24% or more and having decreased concaves and convexes on the fiber surface, which comprises dry-spinning, at a spinning rate of 900 m/minute or more, a cellulose diacetate spinning dope to produce a cellulose diacetate fiber formed of a composition consisting essentially of (1) acetone or a solvent containing acetone and 0 to 5% by weight, based on acetone, of water or methanol, (2) 24 to 33% by weight, based on the total weight of the composition, of cellulose diacetate, and (3) 1 to 3% by weight, based on the cellulose diacetate, of at least one plasticizer selected from the group consisting of a phthalate ester, an aliphatic dibasic acid ester, a fatty acid ester, a phosphate ester, an epoxy plasticizer, and a glycol-ester-containing plasticizer, the composition having a thixotropy index (I), represented by the following equation, of at least 1.3, $$I = \eta_6/\eta_{60} \tag{1}$$

wherein $\eta_6$ is viscosity in poise measured with a Brookfield viscometer at a rotor rotation of 6 rpm at 35° C., and $\eta_{60}$ is viscosity in poise measured with a Brookfield viscometer at a rotor rotation of 60 rpm at 35° C.

2. A process for producing a cellulose diacetate fiber of claim 1, wherein the dry-spinning is conducted at the spinning rate of 900 to 1,000 m/minute.

3. A process for producing a cellulose diacetate fiber of claim 1, wherein the plasticizer of the composition is a phosphate ester or a glycol-ester-containing plasticizer.

4. A process for producing a cellulose diacetate fiber of claim 1 wherein the solvent of the composition is acetone containing 1 to 4% by weight of water or methanol.

5. A process for producing a cellulose diacetate fiber of claim 1 wherein the thixotropy index (I) of the composition has the range of from 1.3 to 5.

* * * * *